Figure 1:
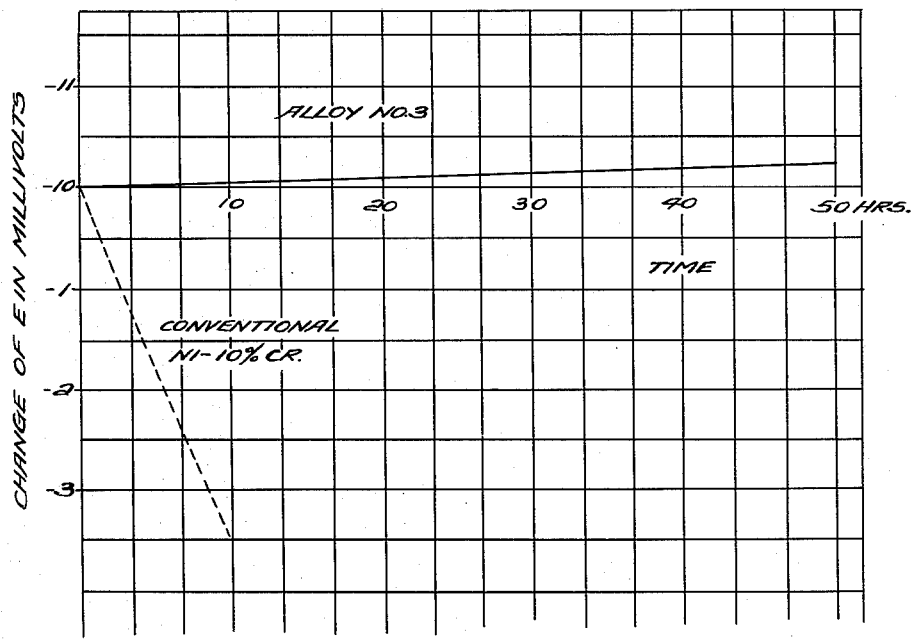

June 27, 1961  W. OBROWSKI ET AL  2,990,440
THERMOCOUPLE
Filed May 12, 1959  4 Sheets-Sheet 1

CHANGE OF ELECTROMOTIVE FORCE WITH TIME OF POSITIVE
THERMOCOUPLE ALLOYS MEASURED AT 700°C AFTER AN-
NEALING AT 1000°C IN A WEAKLY REDUCING ATMOSPHERE.

INVENTORS
WALTER OBROWSKI,
CAROLA VON SEELEN,

BY Bailey, Stephens & Huettig
ATTORNEYS

DIFFERENCE BETWEEN ELECTROMOTIVE FORCES VERSUS PLATINUM OF ALLOYS FOR THERMOCOUPLES ACCORDING TO THE INVENTION AND COMPARATIVE KNOWN ALLOYS (7 AND 7A)

Fig. 4.

2,990,440
THERMOCOUPLE

Walter Obrowski and Carola von Seelen, Hanau (Main), Germany, assignors to Deutsche Gold- und Silber-Scheideanstalt vormals Roessler, Frankfurt am Main, Germany
Filed May 12, 1959, Ser. No. 812,735
Claims priority, application Germany May 17, 1958
8 Claims. (Cl. 136—5)

The invention relates to thermocouples.

It is an object of the invention to provide a new type of thermocouple which is particularly adapted for measuring the industrially interesting temperature range between 900° and 1100° C., while having a high resistance, and correspondingly longer life than the thermocouples which are conventionally used in industry for measuring the above temperature range, against the corrosive effects of furnace gases, in particular of oxygen and sulfur contained in the furnace atmosphere, and which are more resistant in reducing furnace atmospheres to the corrosive effect described as green rot. At the same time it is an object of the invention to provide a new thermocouple of the above described properties, the electromotive force of which is substantially as high in the aforesaid temperature range as that of the known nickel-chromium alloy thermocouples which are likely to become corroded under the above described furnace conditions.

It is therefore, finally, an object of the invention to provide a thermocouple comprising a thermoelectrically positive leg composed basically of an industrially known alloy of nickel containing 10% of chromium, which leg is, however, resistant to green rot, in combination with a negative leg composed basically of a suitable nickel alloy, the resulting combination being of such thermoelectric behavior that it satisfies the standard requirements laid down in NBS Circular 561, issued April 27, 1955, by the U.S. Department of Commerce, and/or the German standards as laid down in DIN 43710.

It is well known that temperatures can be measured by means of thermocouples which comprise two legs, each consisting of a different metal alloy; the two legs are soldered or welded together and, when heated, develop a common electromotive force which is a measure of the temperature applied at the point where two legs are welded together. In general, the temperature-electromotive force relationship of a thermocouple cannot be expressed by a simple equation. However, it is desirable that the electromotive force of a thermocouple be as close as possible to a linear function of the temperature, for this naturally facilitates the calibration of instruments and the calculation of temperature values from the measured electrical values. Since the electromotive force of a thermocouple depends on the chemical composition of both legs, it can be varied by varying the composition of either or both of these legs.

There may be reasons why one of the legs, for instance, the positive leg, is given a composition which develops an electromotive force versus platinum as the other standard leg which is not a linear function of the temperature. Nevertheless, it is possible to build up from such a positive leg a thermocouple having a substantially linear overall temperature characteristic, by using, as the negative leg, an alloy which has a temperature characteristic, versus a platinum standard leg, so deviating from a linear function that the deviations of the positive and the negative legs from a linear temperature characteristic substantially compensate each other.

A great number of combinations of various alloys have been suggested in the art for thermocouples which are suitable for measuring high temperatures. There is, for instance, a particular interest in measuring a temperature range between 900 and 1100° C. with the aid of thermocouples. In the past, thermocouples of noble metals such as, for instance, platinum-rhodium versus platinum have been used exclusively. More recently, thermocouple combinations have been used which consist of nickel-base metal alloys. Of these non-precious metal alloy combinations, thermocouples consisting of a negative nickel leg and a positive leg of a nickel-chromium alloy containing 10% by weight of chromium have been particularly satisfactory during the last 30 years; for alloys of this type have, on the one hand, little tendency to form a scale and develop, on the other hand, high electromotive forces in the above-mentioned temperature range.

Nevertheless, the life time of a thermocouple of this type is limited, in particular because of the corrosive influence of the furnace atmosphere, of varying nature, which may cause a slowly progressing oxidation of the thermocouple material, leading ultimately to rupture of the thermocouple because of scaling through the entire material and, consequently, to failure of the measuring element. Another cause of the gradual destruction of a thermocouple used in furnaces for measuring the temperature of the gases therein may be the absorption of sulfur from the furnace atmosphere, which leads to embrittlement and finally to rupture of the thermocouple wires.

Attempts have been made to delay these detrimental effects of the furnace atmosphere, causing the destruction of the thermocouple, by adding to the thermocouple alloys small amounts of one other metal and sometimes several other metals. Thus, the nickel-chromium leg containing 10% of Cr of the thermocouple has been alloyed with small admixtures of cobalt, aluminum, iron and/or silicon to improve its properties, in particular against the effects of the furnace atmosphere.

However, the more recent development of the metallurgical arts has led increasingly to the use of strong reducing furnace atmospheres in the heating treatment or homogenization of many materials and special alloys. It was found that such reducing atmospheres at high annealing temperatures had another detrimental effect upon nickel-chromium-base alloys used for heating elements, on the one hand, and later in the form of nickel-chromium versus nickel thermocouples, which new type of corrosion is referred to in the art as "green rot." This type of corrosion consists in the selective oxidation of the chromium contained in the nickel-chromium alloy to green-colored chromic oxide. This selective oxidation does not occur when heating the chromium in the open air, but will only occur when the partial pressure of oxygen in the furnace atmosphere has decreased to such a degree that it is almost equal to the partial oxygen pressure of nickel oxide at the prevailing heating temperature, so that the less noble chromium is oxidized, while the nobler nickel still remains unoxidized. Partial oxygen pressures which are low enough to cause this green rot occur, for instance, in the conventionally used mixtures of carbon monoxide and carbon dioxide, or because of the moisture content in generator gas or water gas, and also in industrial nitrogen or hydrogen drawn from high pressure cylinders. In processes which involve heating to incandescence under atmospheres of these various types with low partial oxygen pressures, the chromium in the surface of the thermocouple wire consisting of a nickel-chromium alloy is selectively oxidized, while the nickel contained in the alloy remains unoxidized, or is oxidized only to a limited degree. Consequently, starting from the surface of the wire, the alloy of which the wire is made, becomes increasingly poorer in chromium which leads to changes in the thermoelectric properties of the nickel-10% chromium alloy, and thereby to irreversible changes in the measured results.

As the use of thermocouples for measuring the temperatures has increased, it has become customary in the manufacture of such thermocouples to guarantee, for a given type of combination of alloys in the thermocouple, certain basic values of electromotive force-temperature relationship permitting only a limited tolerance, for instance, of 0.75% of the measured temperature value. In order to guarantee a reliable measurement of temperatures, it is necessary that the above tolerance which is guaranteed at the time of delivery of the thermocouple be maintained, or that it only be exceeded to a very modest degree when the thermocouple has been used for a great length of time under unfavorable atmospheric conditions which necessarily lead to a change in the thermoelectric properties of the thermocouple because of the above-mentioned corrosion phenomena. The known nickel-10% chromium versus nickel thermocouples maintain their thermoelectric properties for several hundred hours when heated to incandescence in an atmosphere of pure air, but their thermoelectric properties are changed in a short time by several times the above-mentioned permitted tolerances if green rot occurs in the nickel-chromium leg of the thermocouple.

In order to overcome this drawback, the above-mentioned nickel-chromium-iron alloys having contents of chromium and iron each of the order of 15 to 20%; still more recently, the nickel alloys have been replaced completely by iron alloys having high chromium and aluminum contents. These last mentioned groups of alloys were found to remain stable even under reduced atmospheres when used as positive legs in thermocouples. Finally, it has been suggested to use as the positive leg in nickel-chromium versus nickel thermocouples certain alloys which contain, besides nickel and chromium, up to about 2% of niobium. This last mentioned additive increases greatly the life and insures a constant performance of such a thermocouple even under reducing atmospheres. However, all of the thermocouples built from alloys having greater resistance to green rot and a longer life time than the conventionally used nickel-10% chromium alloy versus nickel thermocouples, suffer from one important drawback, namely, that their electromotive force is about 25 to 40% lower than that of the fully satisfactory nickel-10% chromium versus nickel thermocouples.

The entire problem of replacing these conventional thermocouples by one of greater resistance to green rot cannot, therefore, be solved merely by finding a suitable alloy for the positive leg which is resistant against green rot, but it is also necessary to find a proper combination of a thermoelectric positive leg of an alloy resistant against green rot with a suitable thermoelectric negative alloy, preferably a nickel base alloy which satisfies internationally recognized thermoelectric standard values for the thermocouple combination nickel-10% chromium versus nickel. As has been mentioned above, these standard values have been described, for instance, in "Reference Tables for Thermocouples" published by the United States Department of Commerce, NBS Circular 561, pages 25 to 28, and in Germany under DIN 43710. No combinations of alloys were known in the past which would satisfy both the aforesaid conditions, when combined in a thermocouple.

With regard to the thermoelectric negative leg in the conventional nickel-chromium versus nickel thermocouples, the materials predominantly used are nickel alloys containing more than 90% by weight of nickel. Such nickel alloys have been used as negative thermocouple legs in combination with such positive legs as, for instance, iron, nickel-10% chromium, nickel-20% chromium, nickel-15% chromium-15% iron, nickel-18% molybdenum, and the like. The alloy used as the negative leg usually contains, besides nickel, additions of one or several other elements, such as, manganese, silicon, cobalt, aluminum, magnesium, calcium, iron, titanium, copper, cerium, and others. These known admixtures have the function of making the nickel alloy of the negative thermocouple leg resistant to the various corrosive influences at high temperatures which occur, for instance, in the furnaces in which these thermocouples are used, and further to change the electromotive forces of these alloys in a characteristic manner, as long as these admixtures present in the alloy are dissolved in the nickel in the form of a crystalline solid solution.

An admixture of manganese, for instance, renders the nickel alloy of the negative thermocouple leg substantially resistant against the attack of sulfur compounds which rapidly make pure nickel brittle; an admixture of aluminum improves the resistance to scaling of the nickel alloys under high temperatures. Admixtures of silicon or alkaline earth metals or of earth metals have similar effects. Magnesium is preferably added in order to increase the workability of the alloys.

All these admixtures influence the electromotive forces of the nickel alloys in a different manner. Thus, the electromotive force of nickel versus platinum is altered differently by an addition of 1% by weight of aluminum than by the addition of 1% of silicon to the nickel. Furthermore, the changes in the electromotive forces of the nickel achieved by the various admixtures are not linear functions proportionate to the temperatures; for example, admixtures are known which change the electromotive force more strongly in the temperature range of, for instance, up to 400° C. than they do at high temperatures. While in many pure metals, which do not undergo polymorphous transition, the electromotive force is linearly dependent on the temperature, i.e., the differential of the electromotive force $dE/dT$ (E being the electromotive force and T the temperature) expressed in microvolts per degree centigrade remains constant up to the vicinity of the melting point, and the same is the case with regard to many alloys which are homogeneous crystalline solid solutions, there is a considerable number of other alloys whose values $dE/dT$ are not constant but vary continuously with the temperature or pass through a maximum or a minimum.

We have solved the problem which has been set forth in detail hereinbefore and attained the objects of our invention by providing a thermocouple having a positive leg of an improved nickel-chromium-base alloy resistant to green rot and to the other above-described corrosive influences, and a negative leg consisting of a nickel alloy, the $dE/dT$ values depending on the temperature change in such a manner that the resulting electromotive force does not deviate substantially over a wide temperature range and, in particular, up to 1100° C., from the international standards mentioned hereinbefore.

More particularly, we have discovered surprisingly, when experimenting with various nickel-base alloys containing about 10% of chromium and other admixtures, which type of alloys has been used for heating conductors, that the above-mentioned corrosive attack described as green rot does not occur with nickel-chromium alloys having a chromium content of about 9% to 11% and further containing an admixture of up to 3%, and preferably 1.8% to 3% of iron and admixed thereto from 0.25% to 1% of an alkaline earth metal, such as magnesium, calcium, strontium and barium, among which calcium is preferred, while these alloys, when combined with a negative nickel alloy leg to be described further below, develop electromotive forces corresponding to the internationally recognized standards for nickel-10% chromium versus nickel thermocouples. We have found that, when these nickel-chromium alloys containing iron and alkaline earth metal admixtures are subjected to the action of an annealing atmosphere of reducing properties, the low oxygen content of the latter will lead to a concurrent oxidization of all components present in the alloy forming the positive leg, whereby the internationally required thermoelectric properties of the thermocouple are maintained constant. We have also found that positive legs consisting of a nickel-chromium alloy used in the thermocouple according to our invention, containing in common a determined minimum amount of iron of about 1% by weight, and an alkaline earth metal as admixture can be subjected to very long heating at temperatures such as 1000° C. and will show only such changes in their thermoelectric behavior as remain within the recognized tolerances admissable in temperature measurements.

The nickel-chromium-base alloys suitable for use as positive legs in the thermocouples according to the invention are composed of nickel with admixtures of 9% to 11% of chromium, up to 3% of iron and up to 1% of metals of the alkaline earth metal group, namely, magnesium, calcium, strontium and barium. All percentages are by weight.

More particularly, these positive leg alloys may contain 1.8% to 3.0% by weight of iron and 0.25% to 1.0% of metals of the alkaline earth metal group. These positive leg alloys may also contain small admixtures of up to 0.8% of aluminum and/or silicon and if desired up to 0.7% of cobalt and/or manganese. It is conventional to add aluminum and silicon as deoxidizing agents in amounts of 0.10% to 0.20% by weight.

We use these additions in amounts of 0.80% in order to control the electromotive force of the leg, and thereby the electromotive force of the entire thermocouple.

The fact that we use iron in amounts above 1% causes a minimum in the curve of the electromotive force of the positive leg alloy according to the invention, in comparison with known positive leg alloys. No electronegative legs were known in the past for combination with nickel-10% chromium alloys containing more than 1% of iron.

The alloys according to our invention used as negative thermocouple legs, in combination with the above described positive legs, are nickel alloys, the $dE/dT$ values of which, when plotted against temperature, show a maximum at about 350° C. and a flat minimum at about 600° C. and which consist essentially of nickel with 2.5% to less than 4% and preferably up to 3.4% of manganese, from 2.6% to less than 4% and preferably up to 3.7% of aluminum, and 0.6% to less than 2% and preferably up to 1.05% of iron and up to 0.4% of silicon. A preferred thermocouple according to the invention thus comprises a negative leg alloy having the composition of:

3% manganese
2.8% aluminum
0.7% iron
0.3% silicon
Balance, nickel and a positive leg alloy having the composition of:

10.0% chromium
2.0% iron
0.40% calcium
0.03% manganese
Balance, nickel

Less manganese in the negative leg alloy would leave the alloy insufficiently resistant to oxygen and particularly to the sulfur content in the furnace gases to which the thermocouple may be exposed.

These negative leg alloys according to the invention have an electromotive force against platinum depending on temperature in the following manner:

| °C | 0 | 100 | 200 | 300 | 400 | 500 | 600 | 700 | 800 | 900 | 1,000 |
|---|---|---|---|---|---|---|---|---|---|---|---|
| Millivolts | 0.0 | −1.46 | −2.47 | −3.29 | −4.08 | −4.92 | −5.80 | −6.66 | −7.46 | −8.21 | −8.92 |

It was only possible to find suitable pairs of positive and negative legs for the thermocouples according to our invention, because it was discovered that the above stated various additions made it possible to influence the conventional nickel alloys in such a way that satisfactory thermocouples answering the above-mentioned problem were obtained. In order to arrive at the above listed electromotive forces versus platinum at the stated temperatures, it is necessary to observe very closely the admixtures of the various components stated above. The herein stated limits are critical, because only alloys containing these additions in the stated amounts will fulfill all conditions necessary to satisfactory electromotive forces versus platinum as well as to their resistance to all corrosive influences to which they may be exposed during the measurement of temperatures, in particular in furnaces.

The invention will be further illustrated by a number of examples of positive and negative thermocouple leg materials. These examples are compiled in Table I which gives the compositions of positive leg alloys, and Table II which illustrates a number of alloys suitable as negative legs. The examples of positive legs have been numbered 1 to 6, while the respective negative legs suited for combination with the corresponding positive legs have been numbered 1a to 6a.

TABLE I

*Composition of alloys used as negative leg in thermocouple according to the invention*

| Alloy component | 1 alloy | 2 alloy | 3 alloy | 4 alloy | 5 alloy | 6 alloy |
|---|---|---|---|---|---|---|
| Cr | 10.0 | 9.8 | 10.0 | 9.1 | 10 | 10.8 |
| Fe | 2.05 | 1.96 | 2.0 | 2.6 | 2.0 | 2.6 |
| Mg | | | | | | 0.3 |
| Ca | 0.30 | | 0.40 | 0.20 | 0.20 | |
| Sr | 0.06 | | | | | |
| Ba | | 0.9 | | | | |
| Al | | 0.01 | | 0.4 | | 0.7 |
| Si | | | | 0.3 | | |
| Co | 0.02 | | | 0.2 | 0.7 | |
| Mn | | | 0.03 | 0.4 | | 0.6 |
| Ni | rest | rest | rest | rest | rest | rest |

TABLE II

*Composition of alloys used as negative leg in thermocouple according to the invention*

| Alloy component | 1a | 2a | 3a | 4a | 5a | 6a |
|---|---|---|---|---|---|---|
| Fe | 0.95 | 0.7 | 0.7 | 0.25 | 1.6 | 0.25 |
| Mn | 3.0 | 3.0 | 3.0 | 3.0 | 2.2 | 3.0 |
| Al | 3.5 | 3.05 | 2.8 | 3.0 | 2.3 | 2.0 |
| Si | 0.03 | 0.11 | 0.3 | | | |
| Ni | rest | rest | rest | rest | rest | rest |

In Table III, the electromotive forces of a number of alloys according to the invention versus platinum are given in millivolts at different temperatures for the legs of thermocouple pairs 1/1a to 6/6a of the compositions illustrated in Tables I and II. In this table, 7/7a represents a conventional Ni-10% Cr positive leg and a theoretical negative leg material (7a) the electromotive force of which was calculated by forming the differences between the values stated in Table 6 on page 25 et seq. of NBS Circular 561, and the electromotive force values of the known alloy No. 7.

platinum of the alloys Nos. 1 to 6 forming the positive legs of the thermocouples according to the invention listed

*Electromotive force of positive and negative legs of thermocouples according to the invention versus platinum*

TABLE III

| No. | Leg | 100° C. | 200° C. | 300° C. | 400° C. | 500° C. | 600° C. | 700° C. | 800° C. | 900° C. | 1,000° C. |
|---|---|---|---|---|---|---|---|---|---|---|---|
| 1 | + | +2.74 | +5.78 | +9.02 | +12.46 | +15.84 | +19.21 | +22.57 | +25.91 | +29.23 | +32.34 |
| 1a | − | −1.40 | −2.41 | −3.27 | −4.00 | −4.73 | −5.55 | −6.37 | −7.19 | −8.01 | −8.84 |
| 2 | + | +2.52 | +5.52 | +8.84 | +12.25 | +15.58 | +18.97 | +22.39 | +25.74 | +29.02 | +32.13 |
| 2a | − | −1.43 | −2.42 | −3.23 | −3.99 | −4.76 | −5.59 | −6.44 | −7.28 | −8.11 | −8.94 |
| 3 | + | +2.64 | +5.66 | +8.92 | +12.32 | +15.73 | +19.11 | +22.48 | +25.84 | +29.15 | +32.39 |
| 3a | − | −1.46 | −2.46 | −3.26 | −4.06 | −4.92 | −5.81 | −6.68 | −7.49 | −8.22 | −8.92 |
| 4 | + | +2.40 | +5.06 | +8.21 | +11.35 | +14.55 | +17.71 | +20.91 | +24.04 | +27.14 | +30.24 |
| 4a | − | −1.69 | −3.06 | −4.01 | −4.96 | −5.96 | −7.04 | −8.09 | −9.19 | −10.29 | −11.38 |
| 5 | + | +2.14 | +5.33 | +8.78 | +12.34 | +15.98 | +19.48 | +23.04 | +26.52 | +30.07 | +33.48 |
| 5a | − | −1.71 | −3.16 | −3.93 | −4.52 | −5.08 | −5.63 | −6.16 | −6.68 | −7.17 | −7.61 |
| 6 | + | +2.14 | +4.71 | +7.50 | +10.44 | +13.46 | +16.52 | +19.62 | +22.72 | +25.82 | +28.93 |
| 6a | − | −2.14 | −3.71 | −4.99 | −6.08 | −7.08 | −8.13 | −9.26 | −10.35 | −11.33 | −12.30 |
| 7 | + | +3.05 | +6.45 | +10.04 | +13.66 | +17.30 | +20.86 | +24.34 | +27.74 | +31.04 | +34.28 |
| 7a | − | −1.05 | −1.68 | −2.17 | −2.74 | −3.35 | −4.05 | −4.80 | −5.56 | −6.32 | −7.03 |

Figure 3:
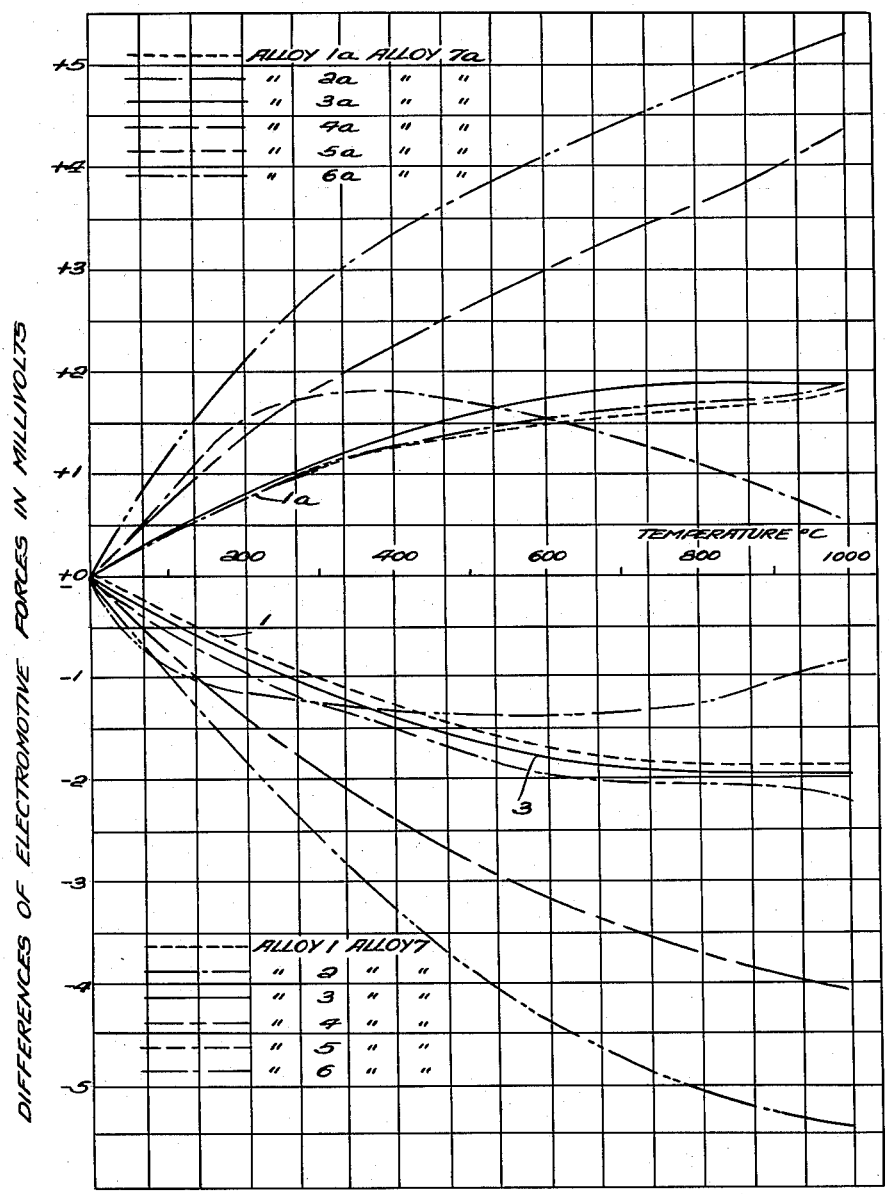

Table IV shows the deviation of electromotive forces of thermocouples 1/1a to 6/6a according to the invention from the standard values for Chromel-Alumel thermocouples at the same temperatures given on pages 25 to 28 of NBS Circular 561. It will be seen from this table that, in particular, the thermocouple combination 3/3a gives excellent results.

in Table III, on the one hand, and a known alloy, namely, nickel containing 10% of chromium. The electromotive forces of this alloy versus platinum have been designated by No. 7 in Table III. Furthermore, FIGURE 3 shows the curves illustrating the differences between the electromotive forces versus platinum of alloys Nos. 1a to 6a used for the negative legs of the thermocouples according to

TABLE IV

*Deviation of electromotive force of thermocouples according to the invention from the standard values of NBS Circular 561*

| Thermocouple Combination of Legs | 100° C. | 200° C. | 300° C. | 400° C. | 500° C. | 600° C. | 700° C. | 800° C. | 900° C. | 1,000° C. |
|---|---|---|---|---|---|---|---|---|---|---|
| 1/1a | +0.04 | +0.06 | +0.08 | +0.06 | −0.08 | −0.15 | −0.20 | −0.20 | −0.12 | −0.02 |
| 2/2a | −0.15 | −0.19 | −0.14 | −0.16 | −0.31 | −0.35 | −0.31 | −0.28 | −0.23 | −0.20 |
| 3/3a | ±0 | −0.01 | −0.03 | −0.02 | ±0 | +0.01 | +0.02 | +0.03 | +0.01 | ±0 |
| 4/4a | −0.01 | +0.01 | +0.01 | −0.09 | −0.14 | −0.16 | −0.14 | −0.07 | +0.07 | +0.31 |
| 5/5a | −0.25 | +0.36 | +0.50 | +0.46 | +0.41 | +0.20 | +0.06 | −0.10 | −0.12 | −0.22 |
| 6/6a | +0.18 | +0.29 | +0.28 | +0.12 | −0.11 | −0.26 | −0.26 | −0.23 | −0.21 | −0.08 |

The surprising thermoelectric effect of the positive thermocouple legs according to the invention, and the superior behavior of the thermocouples which embody the positive legs will become still more obvious from the accompanying drawings in which:

FIGURES 1 to 4 are graphs illustrating the invention.

Figure 2:
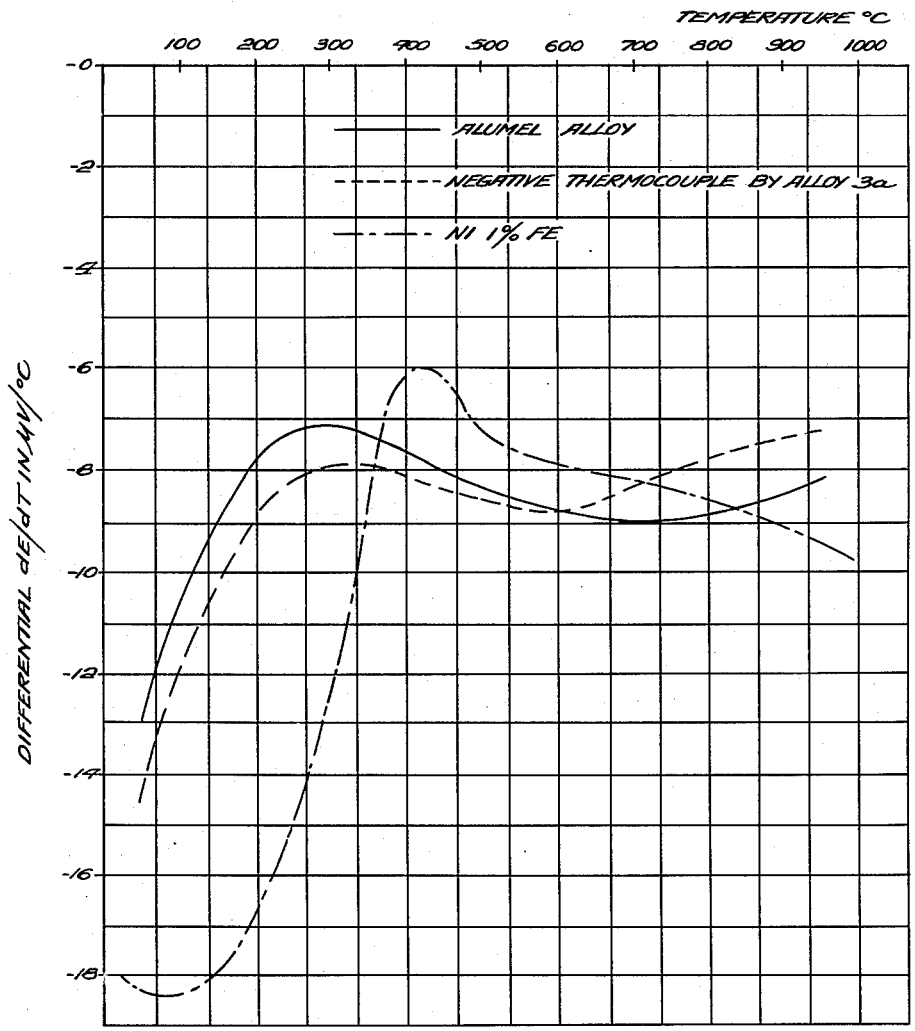

FIGURE 1 is a graph showing the changes of electromotive force (in millivolts) measured at a given temperature of 700° C., which changes take place with time, in a conventional nickel-10% chromium alloy, on the one hand, and in a positive leg alloy (No. 3 of Table I) on the other hand, after both alloys have been annealed at 1000° C. in the same weakly reducing atmosphere. The curves show clearly that the electromotive force of the conventional alloy exposed to the above conditions causing green rot decreases rapidly within ten hours, while alloy No. 3, according to the invention, shows an insignificant increase of the electromotive force over a period of fifty hours;

FIGURE 2 is a graph showing the changes in the differential dE/dT with the temperature of a preferred negative thermocouple leg alloy (3a in Table II) compared with those of a known Alumel alloy and with a known nickel alloy containing 1% of iron, in a thermocouple using alloy 3 as the positive leg, it is at once apparent that the Ni-1% Fe alloy has very different differentials from alloy 3a;

FIGURE 3 illustrates the behavior at different temperatures of the positive and negative legs of the thermocouples 1/1a to 6/6a.

The results obtained with the thermocouple 3/3a as well as the other thermocouples according to the invention such as 1/1a to 6/6a are illustrated in FIGURE 3. The curves shown in this figure illustrate, as the ordinate, the differences between the electromotive forces versus the invention listed in Table III, and the theoretical alloy 7 described above.

Figure 4:
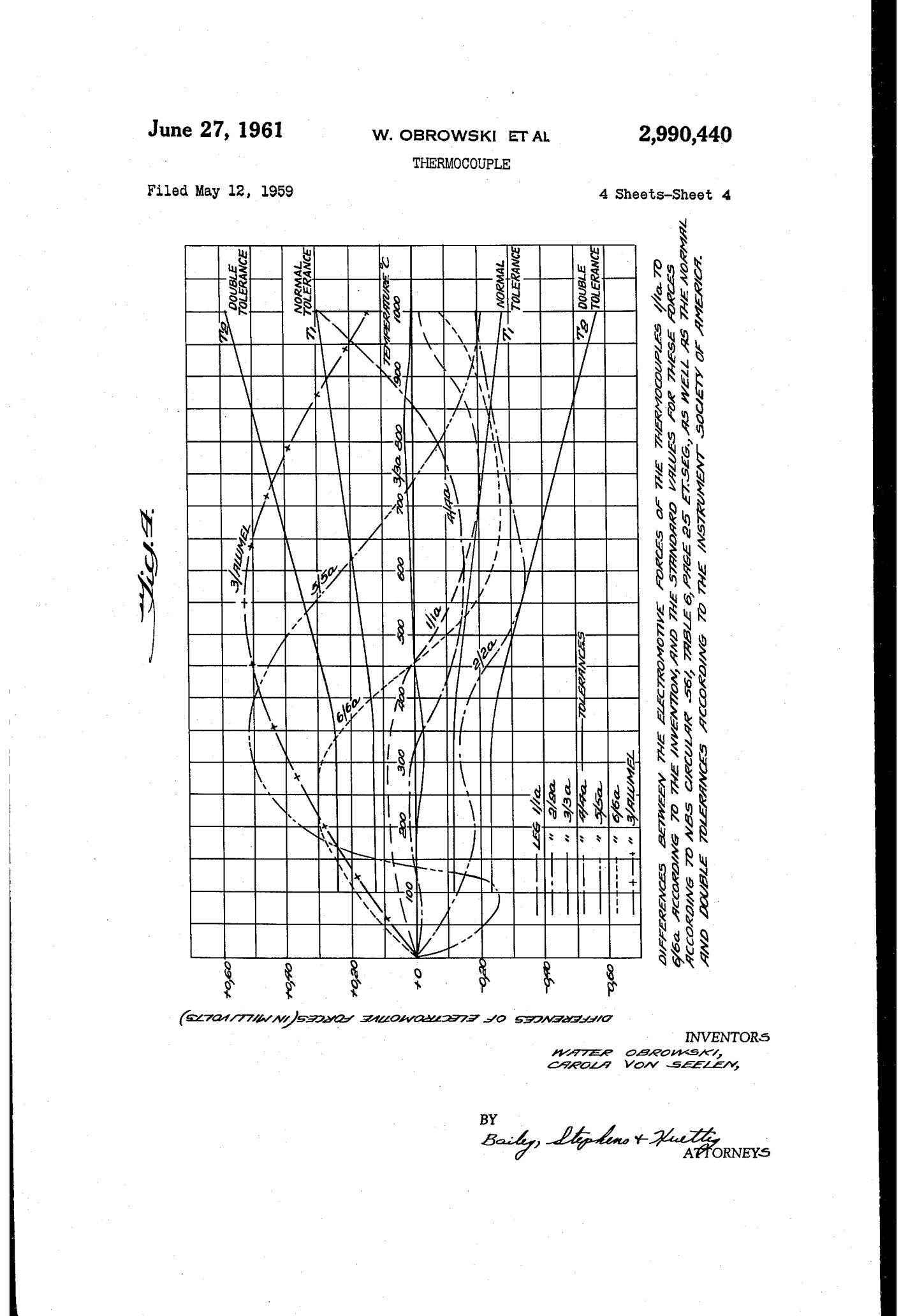

Finally, FIGURE 4 illustrates the differences between the electromotive forces of the thermocouples 1/1a to 6/6a according to the invention, and the standard values for these forces according to NBS Circular 561, Table 6, page 25 et seq., as well as the normal and double tolerances according to the Instrument Society of America. FIGURE 4 also shows by way of comparison the corresponding curve for a hypothetical thermocouple having a positive leg consisting of alloy No. 3 (Table I) and the negative leg of the known Alumel alloy. As can easily be seen from Table IV the latter combination is unsatisfactory since it greatly exceeds the tolerances set by the Instrument Society of America in deviating from the standard values of NBS Circular 561. As can also be seen clearly from FIGURE 4, the thermocouples according to the invention, comply substantially and in the range between about 850° and 1000° C. completely with the normal tolerances of the Instrument Society of America.

As can be clearly seen from curve 3/Alumel of FIGURE 4, the Alumel alloy would not be suitable for combination as a negative thermocouple leg, with a positive leg according to the invention consisting of, for instance, alloy No. 3 of Table I. Clearly, this curve 3/Alumel passes beyond the normal (T1) as well as the double (T2) tolerances of the Instrument Society of America. As can further be seen from the curve of the Ni-1% Fe alloy in FIGURE 2, a thermocouple comprising the aforesaid positive leg alloy No. 3 according to the invention, and the Ni-1% Fe alloy as the negative leg, would fit even less within these tolerances. However, we have found unexpectedly that admixtures of iron in the order of 0.6% to 1.05% as stated above, to nickel-manganese-aluminum alloys of the Alumel type behave according to the temperature curve shown in the dashed line in FIGURE 2, which curve corresponds to alloy No. 3a in Table II. As can be seen from FIGURE 4 and Table IV this alloy 3a combined with the positive leg alloy No. 3 from Table I gives excellent results.

The preferred thermocouple according to the invention is obviously the combination 3/3a, the deviation of which from the standard values of NBS Circular 561 in the given temperature range is zero as can also be seen from Table IV.

The alloys used for the positive legs of the thermocouple according to the invention can be produced, for instance, as described in British Patents 722,145 and 728,752.

The results obtained with the thermocouples according to our invention constitute an important advance in the art of measuring with thermocouples, because these thermocouples have a surprising longevity due to the high resistance of both legs to corrosive influences and, in particular, to the high resistance of the positive legs to green rot, so that the thermocouples guarantee a uniform performance over longer periods than the conventional nickel-10% chromium versus nickel thermocouples or Chromel-Alumel thermocouples of conventional composition. It is, therefore, no longer necessary to replace the thermocouples frequently when using them with high temperature furnaces or at least to remove them from the temperature measuring devices for recalibration purposes. Furthermore, it is no longer necessary, when changing the atmosphere in a furnace from an oxidizing or neutral to a reducing one to replace the temperature measuring and control devices comprising the hitherto used thermocouples which are less resistant to green rot and to recalibrate the devices accordingly. When using thermocouples according to the invention it is thus possible to measure the entire temperature range up to 1100° C. with a single thermocouple developing electromotive forces corresponding to the conventional standard values regardless of whether the annealing atmospheres used in a furnace are of a reducing, a neutral or an oxidizing, or whether they are of a dry or moist nature.

While we have given herein preferred ranges for the iron and alkali metal content of the positive leg and for the iron, manganese and aluminum content of the second leg, substantially improved results as compared with known thermocouples can be obtained within somewhat broader ranges, as follows:

Positive leg: Percent
   Fe _____ 1.0 to 3
   Alkali earth _____ 0.1 to 1
Negative leg:
   Fe _____ 0.2 to 2
   Mn _____ 2.0 to 4
   Al _____ 2.0 to 4

It will be understood that this invention is susceptible to modification in order to adapt it to different usages and conditions and, accordingly, it is desired to comprehend such modifications within this invention as may fall within the scope of the appended claims.

We claim:

1. A thermocouple comprising an electropositive element composed of an alloy consisting essentially of 9% to 11% chromium, 1.0% to 3% iron, 0.1% to 1% of at least one metal selected from the group consisting of magnesium, calcium, strontium and barium, and the balance substantially all nickel, said electropositive element being resistant to green rot; and an electronegative element composed of an alloy consisting essentially of 0.2% to 2% iron, 2.0% to 4% manganese, 2.0% to 4% aluminum and the balance substantially all nickel, said electronegative element developing in combination with said electropositive element an electromotive force.

2. A thermocouple comprising an electropositive element composed of an alloy consisting essentially of 9% to 11% chromium, 1.8% to 3.0% iron, 0.25% to 1.0% of at least one metal of the alkaline earth group and the balance substantially all nickel, said electropositive element being resistant to green rot; and an electronegative element composed of an alloy consisting essentially of 0.60% to 1.05% iron, 2.5% to 3.4% manganese, 2.6% to 3.7% aluminum and the balance substantially all nickel, said electronegative element developing in combination with said electropositive element an electromotive force.

3. A thermocouple comprising an electropositive element composed of an alloy consisting essentially of 9% to 11% chormium, 1.8% to 3.0% iron, 0.25% to 1.0% of at least one metal of the alkaline earth group and up to 0.8% of at least one corrosion inhibiting metal selected from the group consisting of alumimum, silicon, cobalt and manganese, and the balance substantially all nickel, said electropositive element being resistant to green rot; and an electronegative element, composed of an alloy consisting essentially of 0.60% to 1.05% iron, 2.5% to 3.4% manganese, 2.6% to 3.7% aluminum and up to 0.40% of silicon and the balance substantially all nickel, said electronegative element developing in combination with said electropositive element an electromotive force.

4. A thermocouple comprising an electropositive element, composed of an alloy consisting essentially of 10.0% chromium, 2.05% iron, 0.30% calcium, 0.06% strontium, 0.02% cobalt and the balance substantially all nickel, said electropositive element being resistant to green rot; and an electronegative element composed of an alloy consisting essentially of 3.0% manganese, 3.5% aluminum, 0.95% iron, 0.03% of silicon and the balance substantially all nickel, said electronegative element developing in combination with said electropositive element an electromotive force.

5. A thermocouple comprising an electropositive element, composed of an alloy consisting essentially of 9.8% chromium, 1.96% iron, 0.9% barium, 0.01% aluminum, and the balance substantially all nickel, said electropositive element being resistant to green rot; and an electronegative element composed of an alloy consisting essentially of 0.7% iron, 3.0% manganese, 3.05% aluminum, 0.11% silicon and the balance substantially all nickel, said electronegative element developing in combination with said electropositive element an electromotive force.

6. A thermocouple comprising an electropositive element, composed of an alloy consisting essentially of 10.0% chromium, 2.0% iron, 0.40% calcium, 0.03% manganese and the balance substantially all nickel, said electropositive element being resistant to green rot; and an electronegative element composed of an alloy consisting essentially of 0.7% iron, 3.0% manganese, 2.8% aluminum, 0.3% silicon and the balance substantially all nickel, said electronegative element developing in combination with said electropositive element an electromotive force.

7. A thermocouple comprising an electropositive element, composed of an alloy consisting essentially of 9.1% chromium, 2.6% iron, 0.20% calcium, 0.4% aluminum, 0.3% silicon, 0.2% cobalt, 0.4% manganese and the balance substantially all nickel, said electropositive element being resistant to green rot; and an electronegative element composed of an alloy consisting essentially of 0.25% iron, 3.0% manganese, 3.0% aluminum and the balance substantially all nickel, said electronegative element developing in combination with said electropositive element an electromotive force.

8. A thermocouple comprising an electropositive element composed of an alloy consisting essentially of 10.8% chromium, 2.6% iron, 0.3% magnesium, 0.7% aluminum, 0.6% manganese and the balance substantially all nickel, said electropositive element being resistant to green rot; and an electronegative element composed of an alloy consisting essentially of 0.25% iron, 3.0% manganese, 2.0% aluminum and the balance substantially all nickel, said electronegative element developing in combination with said electropositive element an electromotive force.

References Cited in the file of this patent

UNITED STATES PATENTS 2,859,264    Hunter _____ Nov. 4, 1958

FOREIGN PATENTS 773,919    Great Britain _____ May 1, 1957